3,102,944
ARC WELDING PROCESS
John J. Chyle, Milwaukee, Wis., assignor to A. O. Smith Corporation, Milwaukee, Wis., a corporation of New York
Filed Aug. 1, 1960, Ser. No. 46,536
3 Claims. (Cl. 219—74)

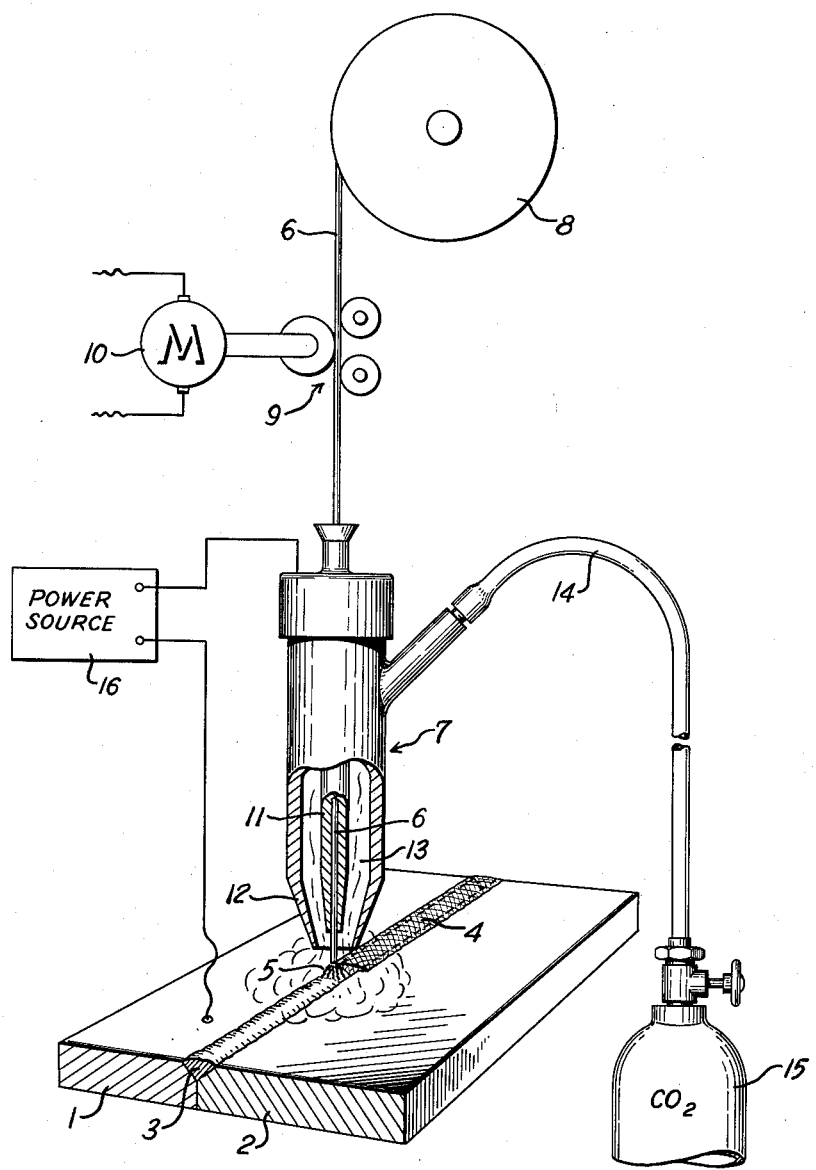
INVENTOR.
John J. Chyle
BY
Andrus & Starke
Attorneys

This invention relates to an improved welding process and particularly to a process of metallic arc welding wherein the arc end of the electrode is buried in a flux and a shielding gas is fed to cover the arc.

Gas-shielded arc welding has been recently widely employed, particularly with the development of carbon dioxide as a shielding medium. A gas-shielded arc is a visible arc and consequently, more desirable than the conventional submerged arc which is completely enclosed within a suitable welding flux. $CO_2$ gas shielding has reduced the cost of gas-shielded arc processes sufficiently to eliminate any competitive disadvantages. However, gas-shielded arc processes particularly with the $CO_2$ shielding gas do not provide as satisfactory appearing weld as the submerged arc.

Thus, with high speed $CO_2$ gas shielded arc welds, there is a tendency to produce an undercutting at the edge of the weld bead. Further, this and similar processes require backing of the joint to prevent the metal from dropping through.

The prior art generally stabilized the arc and improved the welding characteristics of gas-shielded arc welding by adding fluxes and chemical compounds into the shielding gas stream. Although this appears to improve the gas shielded arc welding processes, it does not provide results comparable to submerged arc. This method of protection or correction is particularly wide-spread in $CO_2$ gas-shielded arc welding because of the instability of such arcs. However, the correction does not provide as stable an arc as obtained by the use of inert gas or submerging flux shielding the arc.

The present invention is directed to a combination flux submerged and gas shielded arc which produces a new and improved method of arc welding.

In accordance with the present invention, a flux is deposited in the area to be welded prior to striking of the arc in that area. The depth of the flux blanket is selected to substantially but incompletely enclose the arc established between the electrode and the metal work member. A suitable shielding gas is fed to enclose or cover the arc area and thereby prevent contamination of the weld metal. This method provides a visible arc producing a high quality weld.

In accordance with one aspect of this invention, the flux is iron powder alone or mixed with small amounts of other suitable chemical compounds of the slag-forming type to further improve the smoothness of appearance and other characteristics of the weld.

The process of the present invention results in a very uniform weld bead having an excellent contour without undercutting at the edge of the weld bead and the parent stock. A very stable arc is formed with $CO_2$ shielding gas as well as all other gases and a minimum of spatter is encountered.

The drawing furnished herewith illustrates the best mode presently contemplated for carrying out the invention.

The drawing is a perspective diagrammatic view of a welding system for practicing the new improved welding process of this invention.

Referring to the drawing, a pair of abutting workplates 1 and 2 are disposed in abutting relation with a welding V-groove 3 formed in the upper surface of the abutting workplates 1 and 2. A flux blanket 4 fills the V-groove 3. An arc 5 is struck between the end of an electrode 6 and the base of the V-groove 3 within the flux blanket 4. In the illustrated embodiment or apparatus, the electrode 6 is a consumable electrode continuously fed through a welding head 7 from a reel 8. Drive rolls 9 frictionally grasp the electrode 6 and are driven by a motor 10 to continuously transport the electrode 6 through the welding head 7.

The welding head 7 includes contact tube 11 which is concentrically mounted within a nozzle 12 defining an annular passage through which a shielding gas 13 is directed to cover arc 5. A gas conduit 14 connects the passage to a suitable source 15 of shielding gas. The present invention may employ any suitable gas. The embodiment is described with low cost carbon dioxide gas source for which it is particularly suited. Contact tube 11 is connected to a suitable source of power 16 to establish and maintain the arc 5.

In accordance with the present invention, the flux blanket 4 is disposed or deposited in the V-groove 3 prior to establishing of the arc 5. Although not shown, suitable automatic flux depositing means can be mounted forwardly of the welding head 7 to continuously deposit the flux blanket 4 immediately prior to establishing of the arc.

The arc 5 is then struck between the consumable electrode 6 and the workplates 1 and 2 to melt and deposit the electrode metal into the V-groove 3. The heat of the arc 5 fuses the adjacent metal of the workplates 1 and 2 at the V-groove 3 into a plastic condition to form the weld in accordance with conventional phenomenon.

Simultaneously with the striking of the arc 5 or somewhat prior thereto, the shielding gas 13 is directed through the gas passage to maintain a gas atmosphere enveloping the arc area.

In accordance with the present invention, the depth of the flux blanket 4 is controlled to substantially but incompletely enclose the arc 5. Consequently, a visible arc 5 is established. The combination of the flux blanket 4 and the shielding gas prevents any contamination of the weld.

The flux blanket 4 may consist of any suitable materials. The more conventional materials are iron powder, slag-forming compounds which are normally employed to improve the appearance and the characteristic of the weld and arc stabilizing compounds and the like, singly or in combination. In accordance with an aspect of this invention, the flux is essentially all iron powder, with or without some flux or slag forming materials, for producing particularly satisfactory welding results with a $CO_2$ gas envelope.

The shielding gas can be of any suitable variety. However, this invention permits the use of relatively low-cost $CO_2$ shielding gas while maintaining an exceptionally stable arc.

Although the flux blanket has been described more particularly as a conventional welding flux which is normally in a granular or powdered form, the present invention can also be employed with compressed or compacted fluxes laid over the weld area. Further, although the application as described particularly with regard to welding with a V-groove preparation, the process is equally applicable to other forms of welding including deposit welding and cladding of different metals to a base metal.

The present invention establishes a very stable arc with a resulting high strength weld. The process allows welding from one side with one hundred percent penetration without the necessity for any auxiliary backing means. Excellent fusion at the edge of the weld bead and the parent metal is obtained. The weld has a uniform superior appearance with a very smooth under bead which eliminates the requirement for dressing, reworking or rewelding.

Various modes of carrying out the invention are contemplated as being within the scope of the following claims particularly pointing out and distinctly claiming the subject matter which is regarded as the invention.

I claim:

1. A method of welding by striking a preselected arc between an electrode and a work member, depositing a flux including primarily iron powder and a small amount of slag forming materials over the area to be welded to substantially but incompletely enclose the arc, and feeding $CO_2$ shielding gas to the arc to cover the exposed portion of the arc.

2. A method of arc welding with a predetermined arc preparing the work to be welded with a non-supporting undersurface adjacent the weld area, depositing a flux over the area to be welded to substantially but incompletely enclose the arc, establishing and maintaining the arc in the flux with essentially one hundred percent penetration, and supplying a shielding gas to the arc to cover the exposed portion of the arc.

3. A method of welding by striking an arc of preselected length between an electrode and a work member, which comprises, depositing a flux blanket over the area to be welded to substantially, but incompletely close the arc, and feeding a shielding gas over the arc whereby the flux blanket is maintained about the portion of the arc immediately adjacent the work member and the outer portion of the arc adjacent the electrode is maintained within a protective envelope of gas.

References Cited in the file of this patent

UNITED STATES PATENTS

| | | |
|---|---|---|
| 1,589,017 | Lincoln | June 15, 1926 |
| 2,907,866 | Yenni | Oct. 6, 1959 |

FOREIGN PATENTS

| | | |
|---|---|---|
| 1,146,657 | France | May 27, 1957 |
| 561,906 | Belgium | Nov. 14, 1957 |
| 807,645 | Great Britain | Jan. 21, 1959 |